United States Patent
Norrga

(10) Patent No.: US 9,484,835 B2
(45) Date of Patent: Nov. 1, 2016

(54) MODIFIED VOLTAGE SOURCE CONVERTER STRUCTURE

(75) Inventor: Staffan Norrga, Stockholm (SE)

(73) Assignee: ABB RESEARCH LTD, Zürich (CH)

(*) Notice: Subject to any disclaimer, the term of this patent is extended or adjusted under 35 U.S.C. 154(b) by 0 days.

(21) Appl. No.: 13/500,258

(22) PCT Filed: Oct. 6, 2009

(86) PCT No.: PCT/EP2009/062966
§ 371 (c)(1),
(2), (4) Date: Apr. 4, 2012

(87) PCT Pub. No.: WO2011/042050
PCT Pub. Date: Apr. 14, 2011

(65) Prior Publication Data
US 2012/0195084 A1    Aug. 2, 2012

(51) Int. Cl.
*H02M 7/483*  (2007.01)
*H02M 1/12*   (2006.01)
*H02M 1/14*   (2006.01)

(52) U.S. Cl.
CPC ............ *H02M 7/483* (2013.01); *H02M 1/12* (2013.01); *H02M 1/14* (2013.01); *H02M 2007/4835* (2013.01)

(58) Field of Classification Search
CPC ............ H02M 7/48; H02M 7/49; H02M 2007/4835; H02M 7/42; H02M 7/44; H02M 7/5387; H02M 7/483
USPC ............ 307/43, 64–66, 104; 323/333; 363/16–17, 123, 60, 68, 81, 84, 89, 363/34–43, 95–98, 125–132
See application file for complete search history.

(56) References Cited

U.S. PATENT DOCUMENTS

| | | | |
|---|---|---|---|
| 6,621,719 B2* | 9/2003 | Steimer et al. | 363/43 |
| 7,835,166 B2* | 11/2010 | Hiller | 363/132 |
| 7,960,871 B2* | 6/2011 | Dommaschk et al. | 307/151 |
| 8,138,632 B2* | 3/2012 | Sommer et al. | 307/87 |
| 8,183,874 B2* | 5/2012 | Dommaschk et al. | 324/658 |

(Continued)

FOREIGN PATENT DOCUMENTS

| | | |
|---|---|---|
| DE | 101 03 031 A1 | 7/2002 |
| DE | 10 2005 045 091 A1 | 3/2007 |

(Continued)

*Primary Examiner* — Timothy J Dole
*Assistant Examiner* — Ivan Laboy Andino
(74) *Attorney, Agent, or Firm* — Birch, Stewart, Kolasch & Birch, LLP

(57) ABSTRACT

The invention concerns a voltage source converter (26) comprising a group of phase legs, at least three connection terminals (AC1, AC2, AC3, DC+, DC−) for connecting the phase legs to power transmission elements, a first group of cells (C1$p$1, C2$p$1, C1$n$1, C2$n$1, C1$p$2, C2$p$2, C1$n$2, C2$n$2, C1$p$3, C2$p$3, C1$n$3, C2$n$3) in each phase leg and a second group of cells (C3$p$1, C3$n$1, C3$p$2, C3$n$2 C3$p$3, C3$n$3). The cells (C1$p$1, C2$p$1, C1$n$1, C2$n$1, C1$p$2, C2$p$2, C1$n$2, C2$n$2, C1$p$3, C2$p$3, C1$n$3, C2$n$3) in the first group are only capable of providing unipolar voltage contributions to the converter and connected for only being capable of such unipolar voltage contributions, while the cells (C3$p$1, C3$n$1, C3$p$2, C3$n$2 C3$p$3, C3$n$3) in the second group are connected to the corresponding cells of the first group and arranged to have bipolar voltage contribution capability.

23 Claims, 4 Drawing Sheets

(56) References Cited

U.S. PATENT DOCUMENTS

| | | | |
|---|---|---|---|
| 8,233,300 B2* | 7/2012 | Dommaschk et al. | 363/132 |
| 8,385,086 B2* | 2/2013 | Hiller et al. | 363/17 |
| 8,400,796 B2* | 3/2013 | Dofnas et al. | 363/71 |
| 2003/0026111 A1 | 2/2003 | Steimer et al. | |
| 2008/0232145 A1* | 9/2008 | Hiller et al. | 363/56.01 |
| 2008/0259661 A1 | 10/2008 | Hiller et al. | |
| 2008/0310205 A1 | 12/2008 | Hiller | |
| 2010/0118578 A1 | 5/2010 | Dommaschk et al. | |
| 2011/0089873 A1* | 4/2011 | Blocher et al. | 318/400.3 |
| 2011/0235375 A1* | 9/2011 | Dommaschk et al. | 363/54 |
| 2012/0127766 A1* | 5/2012 | Crookes | H02J 3/1857 363/126 |
| 2012/0170338 A1* | 7/2012 | Trainer | H02M 7/483 363/127 |
| 2012/0182771 A1* | 7/2012 | Trainer et al. | 363/51 |
| 2012/0188803 A1* | 7/2012 | Trainer et al. | 363/37 |
| 2012/0201059 A1* | 8/2012 | Berggren et al. | 363/53 |

FOREIGN PATENT DOCUMENTS

| | | |
|---|---|---|
| EP | 1 253 706 A1 | 10/2002 |
| WO | WO 2007/033852 A2 | 3/2007 |
| WO | WO 2008/067785 A1 | 6/2008 |
| WO | WO 2009115125 A1 * | 9/2009 ............ H02M 7/483 |

* cited by examiner

10: Voltage power transmission system
12: First AC power line
14: First transformer
16: Rectifier
18: Inverter
20: DC power transmission line
22: Second transformer
24: Second AC power line

MODIFIED VOLTAGE SOURCE CONVERTER STRUCTURE

FIELD OF INVENTION

The present invention generally relates to voltage source converters. More particularly the present invention relates to a voltage source converter for connection between power transmission elements related to a power transmission system.

BACKGROUND

There have recently evolved voltage source converters that are based on cascaded voltage source converter cells provided in phase legs. These provide discrete voltage levels that can be combined for conversion between AC and DC. Each cell is here made up of an energy storage element, typically a capacitor, being connected in series with two switching elements for forming a half-bridge converter cell. These cells typically have two connection terminals, where a first is provided in the junction between the two switching elements and a second in the junction between one of the switching elements and the energy storage element. The placing of the second terminal in the half-bridge cell defines the cell type, where it may be placed at the junction between one of the switching elements and the energy storage element. The placing of the second terminal at a first such junction therefore defines a first type of half-bridge cell, while the placing of the second connection terminal at a second junction defines a second type of cell.

These types of cells are generally described in relation to a voltage source converter in DE 10103031. This document also discloses how half-bridge cells of the same type can be provided in pairs in a phase leg, where one cell in a pair has one orientation and the other cell in the pair has the opposite orientation. This means that a first terminal of a first cell in a pair is connected to the second terminal of a second cell in the pair.

Other documents describing the same principle are "A new modular voltage source inverter topology", by A Lesnicar and R Marquardt, UNIV. BUNDESW. NEUBIBERG 2003, XP002447365, 10$^{th}$ European Conference on Power Electronics and Applications, 2-4 Sep., 2003, Toulouse, France as well as "Modulares Stromrichterkonzept für Netzkupplungsanwendung bei hohen Spannungen" by Rainer Marquardt, Anton Lesnicar and Jürgen Hildinger, UNIV. BUNDESW. NEUBIBERG 2002, XP002447360, Bad-Nauenheim, Germany.

Further documents describing this area are WO 2007/033852, which is directed towards controlling valve leg currents in a power converter as well as WO 2008/067785 which describes the control in a voltage source converter for regulating circulating currents. In both these latter documents cells of the same type are used that have the same orientation in relation to each other.

The above described modular converter structure provides adequate conversion ability. However, it would be of interest to modify the structure so that enhanced functionality is possible and simplified at a low additional cost.

SUMMARY OF THE INVENTION

One object of the present invention is to provide a voltage source converter having a modified structure that enables the provision of enhanced functionality in a simple way.

This object is according to a first aspect of the present invention solved through a voltage source converter for connection between power transmission elements related to a power transmission system, and comprising a group of interconnected phase legs, where each phase leg has a first and a second end point via which said interconnection is achieved, at least three connection terminals for connecting the phase legs to the power transmission elements, a first group of cells related to each phase leg, and a second group of cells, wherein the cells in the first group are only capable of providing unipolar voltage contributions to the operation of the converter and are also connected in the phase legs for only being capable of providing such unipolar voltage contributions, and the cells in the second group are connected to the corresponding cells of the first group and are arranged for being capable of providing bipolar voltage contributions to the operation of the converter.

The present invention has a number of advantages. Through the invention it is possible to provide cells that are not involved directly in the basic functionality of the converter operation but that remove some of the problems or enhance the functionality of the converter together with cells providing this basic functionality. In this way it is possible to provide the voltage source converter as a modular voltage source converter. It is thus possible to select cells in the one group based on the basic functionality required and cells in the other group based on desired additional functionality. This may also simplify the generation of control signals, since these can be formed for only handling the additional functionality without having to consider the basic converter functionality or any other additional functionality or vice versa. Thus both the design of the actual converter as well as the control scheme used for it is simplified. This is furthermore done at small extra cost in the form of additional components and software.

The second group may include at least one cell having bipolar voltage contribution capability. It may also include at least two cells, each having unipolar voltage contribution capability and having opposite orientations in relation to each other in their connection to the cells of the first group.

The number of cells according to type and their orientation may be the same in all phase legs. In case the phase legs each include a positive and a negative arm, the number of cells according to type and their orientation can also be the same in the two arms of each phase leg.

It is also possible that at least one cell in the second group associated with a phase leg is connected between the end points of the corresponding phase leg. Here this cell can be connected in the phase leg in question. It can also be joined to the phase leg via a connective branch.

The phase legs may be connected in parallel between two direct current terminals of the converter and each include a positive and a negative arm.

At least one cell in the second group may be connected to the cells in the first group via a connective branch that stretches between a connection terminal and a midpoint of a phase leg. At least one cell in the second group may also be connected to the cells in the first group via a connective branch connecting a connection terminal with one end of at least one phase leg.

The voltage source converter may furthermore include a control unit that provides control signals to cells in order to control the operation of the voltage source converter. The control unit may be arranged to provide control signals to the cells in the second group for making these cells provide additional AC voltages for enhancing converter operation. Three of the connection terminals may be AC connection terminals and the control unit may be arranged to provide control signals to at least some cells in the second group for making these cells provide a third harmonic zero sequence on all AC connection terminals. Control signals may also be provided to at least some cells in the second group for increasing the reactive power capability of the converter. Control signals may furthermore be provided to at least some cells in the second group for making these cells provide a common AC voltage contribution that counteracts current circulation between the phase legs.

Each cell may include a first group of switching elements in parallel with one energy storage element, where the switching elements in the first group may be connected in series with each other. Each switching element may furthermore include a transistor together with an anti-parallel diode. A cell in the second group may also include a second group of switching elements in parallel with the energy storage element

BRIEF DESCRIPTION OF THE DRAWINGS

The present invention will in the following be described with reference being made to the accompanying drawings, where FIG. 1 schematically shows a direct current power transmission system in which a voltage source converter according to the invention may be provided, FIG. 2 schematically shows a first type of voltage source converter according to a first embodiment of the invention having a number of parallel phase legs each provided with four variable voltage sources being controlled by a common control unit, FIG. 3 schematically shows a voltage source converter according to the first type in which the controlled voltage sources are implemented as a number of cells, FIG. 4 schematically shows the structure of a first type of cell, FIG. 5 schematically shows the structure of a second type of cell, FIG. 6 schematically shows the structure of a third type of cell, and FIG. 7 schematically shows the first type of voltage source converter according to a second embodiment of the invention having variable voltage sources being connected in branches connecting connection terminals with the phase legs.

DETAILED DESCRIPTION OF THE INVENTION

In the following, a detailed description of preferred embodiments of a device and a method according to the present invention will be given.

Figure 1:
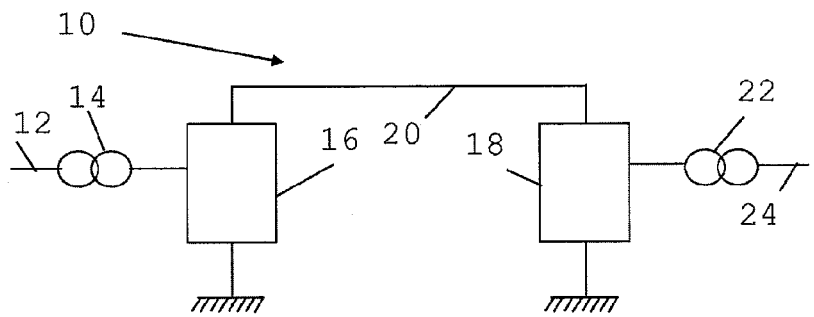

In FIG. 1 there is schematically shown a simplified high-voltage power transmission system 10 in which a voltage source converter according to the present invention may be used. The power transmission system 10 may be a direct current power transmission system 10 and then for instance an HVDC (High Voltage Direct Current) power transmission system. It should be realized that the present invention is not limited to such a system, but may be used in relation to other types of power transmission systems.

In the figure there is a first AC power line 12, which leads to a first transformer 14. The first transformer 14 is connected to a rectifier 16, which rectifies the AC voltage to a DC voltage. This rectifier 16 is in turn connected to a DC power transmission line 20, which in turn leads to an inverter 18, which converts DC power to AC power. The inverter 18 is furthermore connected to a second transformer 22. The second transformer 22 is in turn connected to a second AC power line 24. The rectifier 16 and inverter 18 are furthermore connected to ground.

The system shown in FIG. 1 may be a so-called monopole system. However, in the following description it will be described in terms of a bipole system. Here both the inverter and rectifier may be provided as a voltage source converter according to the present invention.

It should here be realized that the environment in which a voltage source converter according to the invention may be provided is not limited to the system in FIG. 1. This system is only exemplifying. A voltage source converter according to the invention may for instance also be provided in for instance HVDC back-to-back systems, which are used for adapting the phase of two AC transmission systems to each other, in a grid type DC power transmission system and in an SVC (Static VAr compensator) for a FACTS (Flexible Alternating Current Transmission System) system.

As mentioned above the system in FIG. 1 includes one or more voltage source converters provided according to the principles of the present invention.

Figure 2:
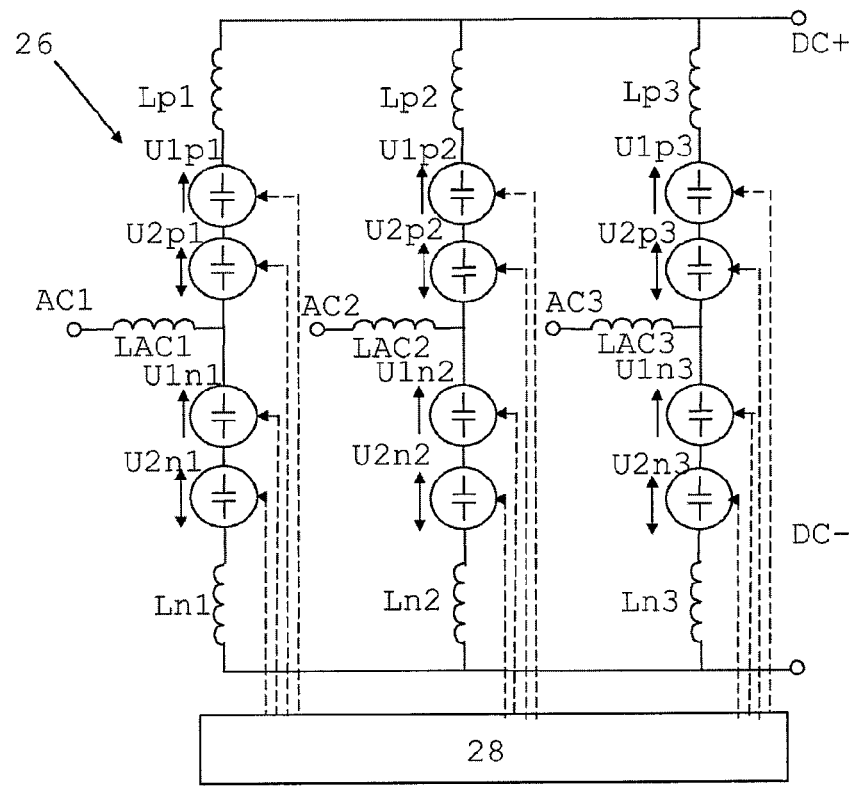

FIG. 2 shows a block schematic outlining an example of a first type of voltage source converter 26 according to a first embodiment of the invention, which may be provided as either the rectifier 16 or the inverter 18 in FIG. 1 or both. The voltage source converter 26 here includes a group of interconnected phase legs. The phase legs are more particularly connected in parallel between two DC terminals DC+ and DC−. In the example given here there are three such phase legs because the AC system is a three-phase AC transmission system. It should however be realized that there may be for instance only two phase legs. Each phase leg has a first and a second end point via which the above-mentioned interconnection is achieved. In these types of converters the first end points of all the phase legs are connected to a first DC terminal DC+ via a first connective branch and the second end point is connected to a second DC terminal DC− via a second connective branch. It is thus clear that the voltage source converter is provided for connection between power transmission elements, such as transformers and power lines, which elements are related to a power transmission system.

Each phase leg of this first type of voltage source converter 26 furthermore includes a positive and a negative arm connected to each other and at the junction where the arms meet, which is the midpoint of the phase leg, there is provided an AC terminal. In the exemplifying voltage source converter 26 there is here a first phase leg having a positive arm p1 and a negative arm n1, a second phase leg having a positive arm p2 and a negative arm n2 and a third phase leg having a positive arm p3 and a negative arm n3. At the junction between the positive and negative arm of the first phase leg there is provided a first AC terminal AC1. At the junction between the positive and negative arm of the second phase leg there is provided a second AC terminal AC2 and at the junction between the positive and negative arm of the third phase leg there is provided a third AC terminal AC3. Each AC terminal is here connected to the corresponding phase leg via a connective branch including an inductor LAC1, LAC2, LAC3. Here each arm furthermore includes one inductor Lp1, Ln1, Lp2, Ln2, Lp3 and Ln3. In this embodiment these inductors are connected to the corresponding DC terminal DC+ and DC−. Each arm furthermore includes two variable voltage sources $U1p1$, $U2p1$, $U1n1$, $U2n1$, $U1p2$, $U2p2$, $U1n2$, $U2n2$, $U1p3$, $U2p3$, $U1n3$ and $U2n3$ being connected to a common control unit 28 for control. The control of these voltage sources is here indicated by dashed unidirectional arrows stretching from the control unit 28 to the variable voltage sources.

A time-varying voltage can generally be divided into various components, like a DC component and an AC component. An AC component can here include a fundamental AC component as well as harmonic AC components. It is possible to provide such voltage components in a phase leg using the controllable voltage sources.

The common control unit 28 controls the voltage sources for obtaining a required functionality. The variable voltage sources are here of a first type having unipolar voltage contribution capability and of a second type having bipolar voltage contribution capability. Unipolar voltage contribution capability here involves the provision of a voltage with only one polarity, either a negative or a positive polarity. A controlled voltage source converter having unipolar voltage contribution capability always provides a DC contribution and may therefore be used in converter applications involving a DC component, such as in AC/DC conversion. A bipolar voltage contribution capability here involves the ability to provide voltages of two polarities, i.e. both positive and negative voltages. This allows this type of controllable voltage source to be used in converter applications where there are no DC voltage contributions. The variable voltage sources of both types provide a voltage based on energy stored in energy storage elements, such as capacitors, and therefore these are symbolized by a circle enclosing a capacitor. As controllable voltage sources of the first type can only provide voltage contributions of one polarity, they are symbolized through the use of a unidirectional arrow to the left of the circle and pointing towards the first DC terminal DC+. However, the controllable voltage sources of the second type have bipolar voltage contribution capability, they are therefore symbolized through the use of a bidirectional arrow to the left of the circle. As can be seen the voltage source converter 26 includes a variable voltage source $U1p1$, $U1n1$, $U1p2$, $U1n2$, $U1p3$ and $U1n3$ of the first type in each arm, i.e. a variable voltage source having unipolar voltage contributing capability, as well as a variable voltage source $U2p1$, $U2n1$, $U2p2$, $U2n2$, $U2p3$, $U2n3$ of the second type in each arm, i.e. a variable voltage source having bipolar voltage contribution capability.

The variable voltage sources are according to the present invention furthermore realized in the form of voltage source converter cells or cells being connected to each other, for instance in series. This is exemplified by FIG. 3, which shows the same phase legs as the phase legs of the voltage source converter of the first type in FIG. 2, but with the voltage sources in each leg being replaced by a number or a string of voltage source converter cells. In the present example the legs are furthermore symmetrical, i.e. they include the same number of converter cells distributed in the same way between the legs and also between the arms of the legs. The cells may furthermore be of different types. The mix of cell types may be the same from phase leg to phase leg and here also from arm to arm of each phase leg. Their positions in an arm may however change from arm to arm. The number of cells according to type and their orientation is thus the same in all the phase legs. The number of cells according to type and their orientation can even be the same in all the arms of the phase legs.

In the present example there are three cells in each arm. Thus the positive arm of the first phase leg includes three cells $C1p1$, $C2p1$ and $C3p1$, while the negative arm of the first phase leg includes three cells $C1n1$, $C2n1$ and $C3n1$. In a similar fashion the positive arm of the second phase leg includes three cells $C1p2$, $C2p2$ and $C3p2$, while the negative arm of the second phase leg includes three cells $C1n2$, $C2n2$ and $C3n2$. Finally the positive arm of the third phase leg includes three cells $C1p3$, $C2p3$ and $C3p3$, while the negative arm of the third phase leg includes three cells $C1n3$, $C2n3$ and $C3n3$. The numbers are here only chosen for exemplifying the principles of the present invention. It is often common to have many more cells in each phase leg.

Figure 3:
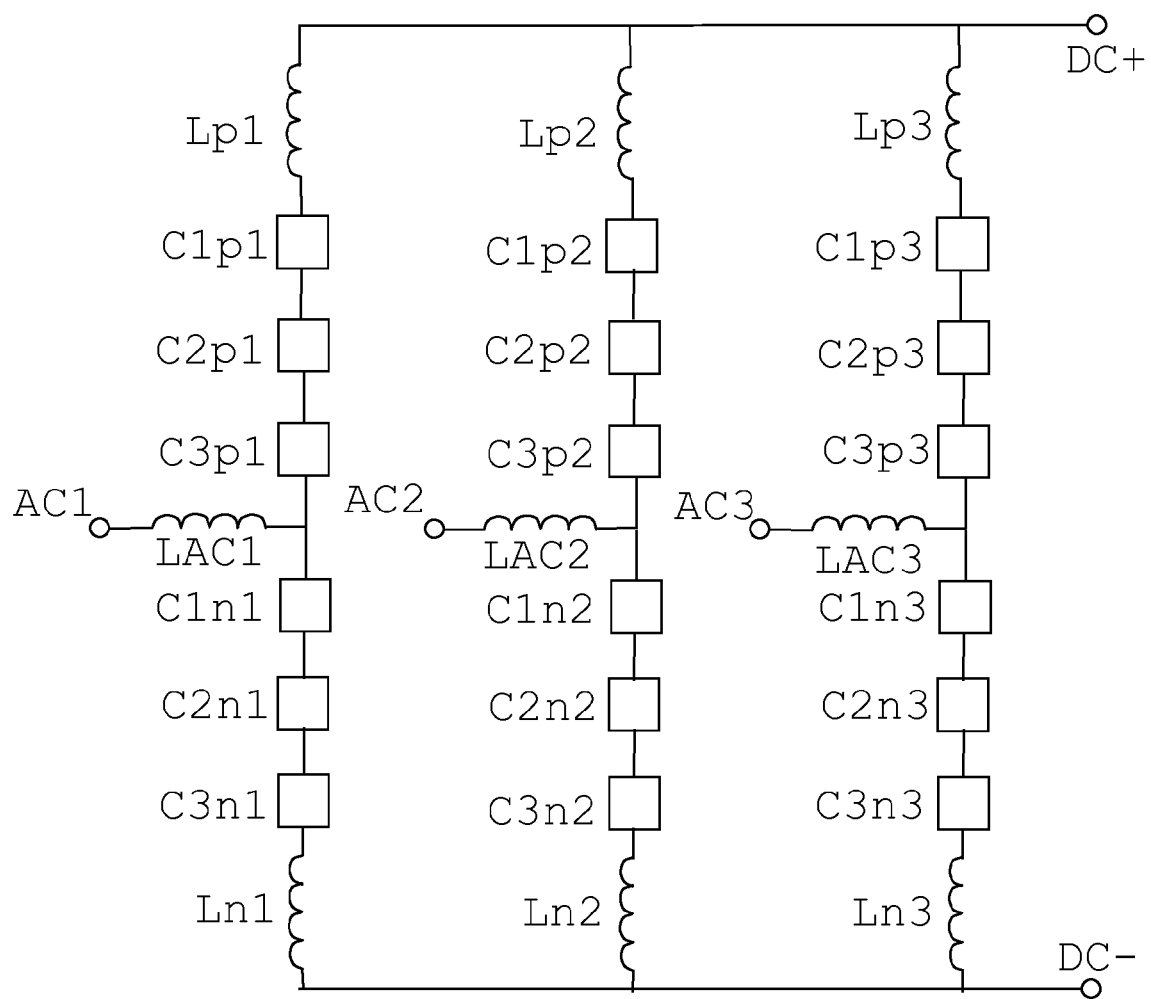

The cells can be cells in a first group of cells having unipolar voltage component contribution capability, i.e. only being capable of providing a voltage contribution with one polarity, either positive or negative, and being connected so that only this unipolar voltage contribution capability is enabled. The cells can also be cells in a second group of cells being connected for having bipolar voltage contribution capability, i.e. for being able to provide voltage contributions that can be both positive and negative. The cells in this group may include cells that have bipolar voltage contribution capability. However, this group may also include cells having unipolar voltage contribution capability, but being connected between the end points of the phase leg for having bipolar voltage contribution capability. Such a connection is typically performed through placing two, or a pair of, cells having unipolar voltage contribution capability that are of the same type but having opposite orientations in the phase leg or even in the arm of a phase leg. The cells shown in FIG. 3 are each controlled by the common control unit (not shown). They therefore each receive a control signal for contributing to the total operation of the voltage source converter.

Figure 4:
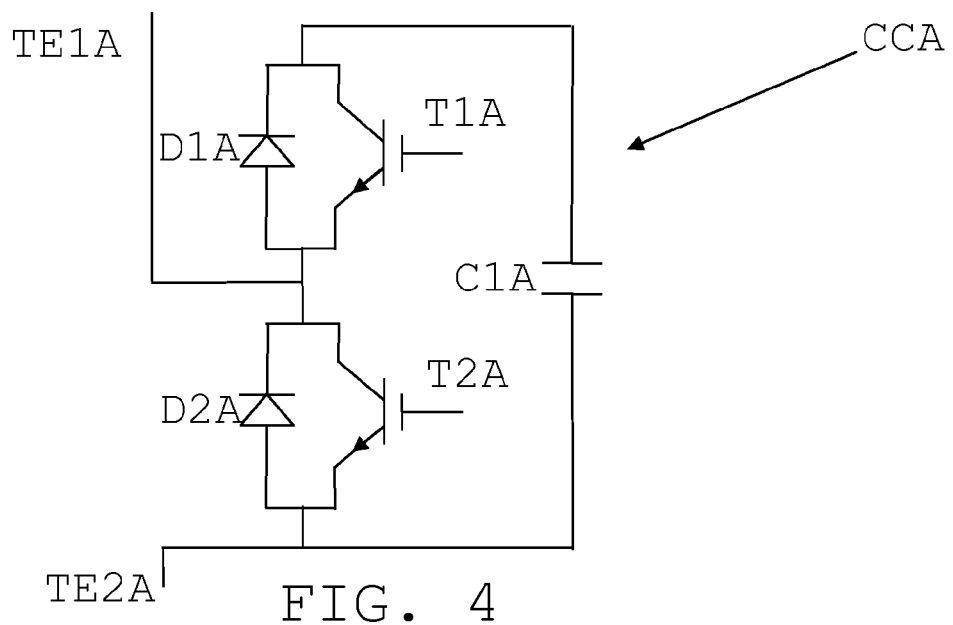

FIG. 4 schematically shows a first type of converter cell CCA that may be used for providing a controllable voltage source of the first type. The cell CCA is a half-bridge converter cell and includes an energy storage element in the form of a capacitor C1A, which is connected in parallel with a branch including two switching elements, where each switching element may be realized in the form of a semiconductor element that may be a transistor, which may with advantage be an IGBT (Insulated Gate Bipolar Transistor) together with an anti-parallel diode. In FIG. 4 there is therefore a first switching element having a first transistor T1A with a first diode D1A oriented upwards in the figure and connected in parallel between emitter and collector of the transistor T1A. There is also a second switching element connected in series with the first switching element and having a second diode D2A having the same orientation as the first diode D1A and connected in parallel between emitter and collector of a second transistor T2A. The cell has a first connection terminal TE1A and a second connection terminal TE2A, each providing a connection for the cell to a phase leg of a voltage source converter. In this first type of cell the first connection terminal TE1A more particularly provides a connection from the phase leg to the junction between the first and the second switching element, while the second terminal TE2A provides a connection from the phase leg to the junction between the second switching element and the capacitor C1A.

Figure 5:
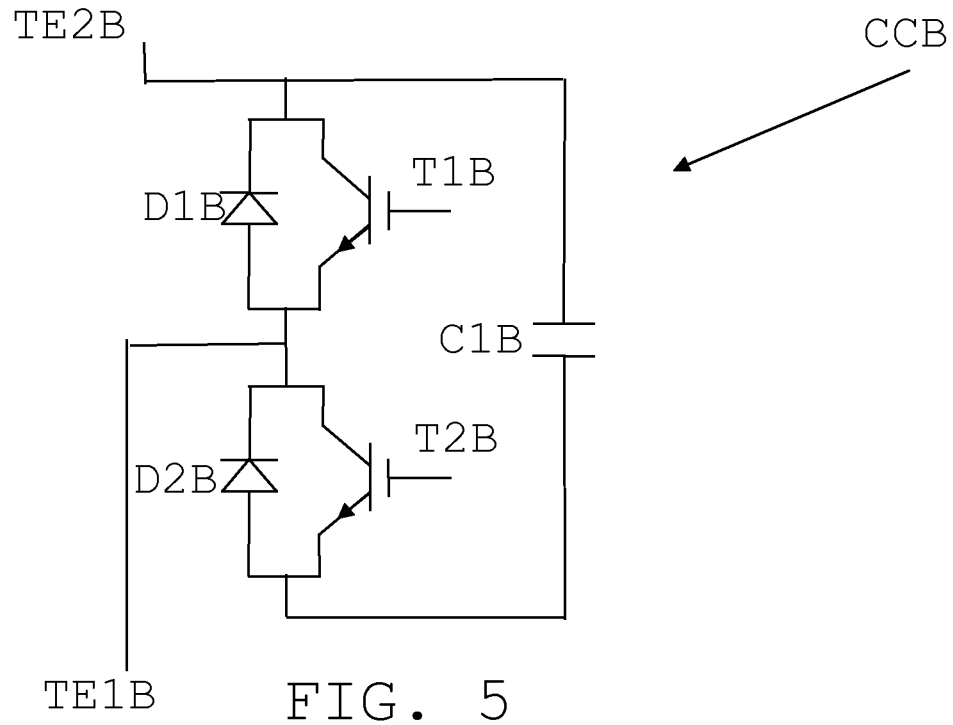

FIG. 5 schematically shows a second type of half-bridge converter cell CCB having the same type of components as the first type and being interconnected in the same way. There is thus here a first switching element having a first transistor T1B and a first anti-parallel diode D1B in series with a second switching element having a second transistor T2B with a second anti-parallel diode D2B. In parallel with these switching elements there is a capacitor C1B, where the first switching element of this second type of cell has the same position and orientation as the first switching element of the first type of cell and the second switching element of this second type has the same position and orientation as the second switching element of the first type of cell in the branch. There is also here a first terminal TE1B providing a connection between the phase leg and the connection point between the first and the second switching elements. However as opposed to the first type of cell, the second terminal TE2B here provides a connection between the phase leg and the junction between the first switching element and the capacitor C1B.

The cells of the first and second types do always provide a DC component and may therefore be used for conversion between AC and DC. These cells thus both have unipolar voltage contribution capability, where the actual voltage contribution depends on how the switches are operated and how the cells are oriented in a phase leg. In these cells only one switching element should be turned on at a time and when this happens a cell of a specific type provides a positive or no contribution, i.e. a zero voltage contribution, when being connected with one orientation and a negative contribution when being connected with an opposite orientation. A contribution is here the voltage across the capacitor.

Figure 6:
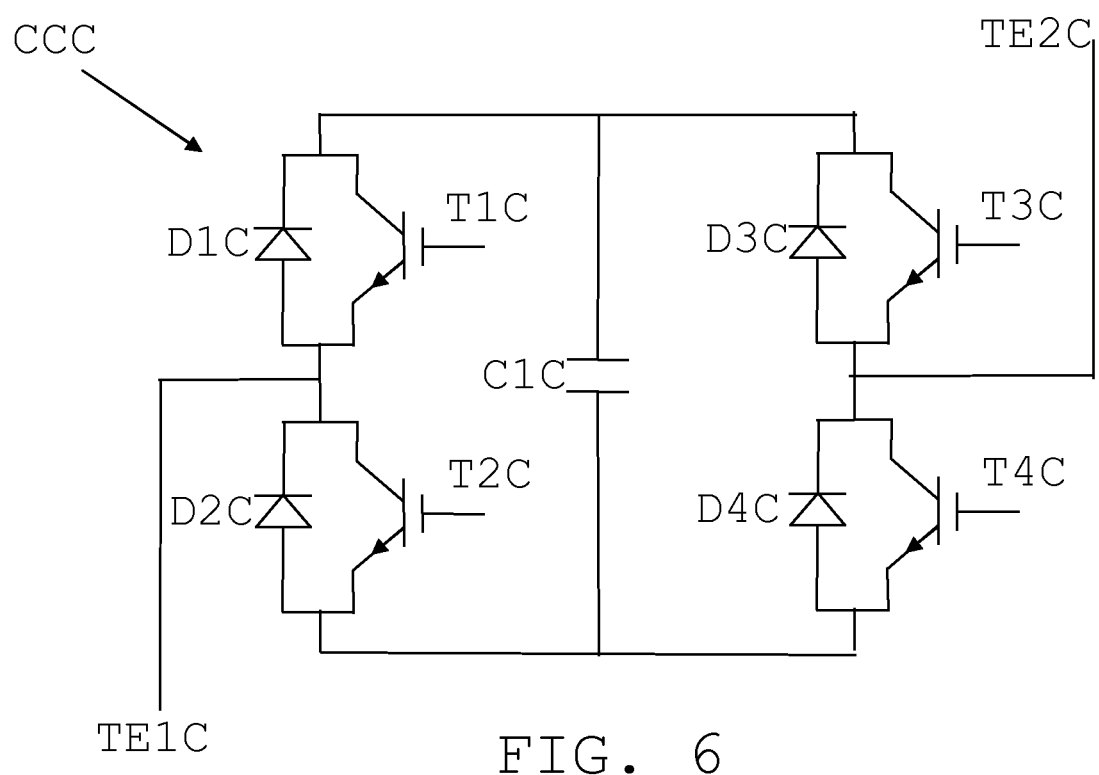

FIG. 6 schematically shows a third type of converter cell CCC including the same type of components, i.e. a first and a second switching element each including a first and a second transistor T1C and T2C with anti-parallel first and second diodes, D1C and D2C, in a branch provided in parallel with a capacitor C1C. These are provided in the same way as in the first and second types of cells. However here there is a third and a fourth switching element in series with each other, which switching elements are provided through a third transistor T3C with anti-parallel third diode D3C and through a fourth transistor T4C with anti-parallel fourth diode D4C, in a further branch provided in parallel with the capacitor C1C. As before, a first terminal TE1C here provides a connection between the phase leg and the junction between the first and the second switching elements. However the second terminal TE2C here provides a connection between the phase leg and the junction between the third and fourth switching elements. As opposed to the elements of the first and second type, this cell CCC does not have unipolar voltage contribution capability, but bipolar voltage contribution capability. This cell does here provide a positive, a negative or a zero voltage contribution based on the switching of the switching elements. If for instance the first and the fourth switching elements are turned on simultaneously, then a voltage contribution having one polarity is provided, while if the second and the third switching elements are turned on simultaneously a voltage contribution having an opposite polarity is provided. Also here the contribution is the voltage across the capacitor. If the first and the third switching elements or the second and the fourth switching elements are turned on simultaneously then there is no voltage contribution.

Also the first and second type of cells can be connected for providing bipolar voltage contribution capability in the above mentioned sense. This requires that two cells of the same type are connected in the same arm, i.e. they form a pair. They then have the opposite orientation. This means that the first terminal TE1 of one cell in the pair may be connected closer to one of the end points of the phase leg than the second terminal TE2 of this cell, while the second terminal TE2 of the other cell in the pair is connected closer to the same end point of the phase leg than the first terminal TE1 of this other cell.

This cell combination will in effect provide a functionality that is the same as the functionality of the cell of the third type. It should here be known that the cells of a pair need not necessarily be directly connected to each other, but that other cells may be connected in-between them. However, it may be preferred to keep them connected to each other.

The present invention is directed towards combining cells in a voltage source converter. This allows the functionality of a voltage source converter to be improved. This improved function may with advantage involve the provision of additional AC voltages. The voltage source converter may here be of the first type as shown in FIG. 2.

According to the present invention each phase leg of a voltage source converter is provided with cells in at least one of two groups. According to the invention each phase leg includes cells in the first group of unipolar cells only capable of unipolar voltage contributions. They are furthermore also being connected in the phase legs for only being able to make unipolar voltage contributions. According to the invention a voltage source converter also includes cells in a second group, where the cells are connected to the cells in the first group and arranged to have bipolar voltage contribution capability. The first group of cells is therefore used to form a controllable voltage source of the first type, while the second group of cells is used to form a controllable voltage source of the second type. As mentioned earlier these groups are then combined in a voltage source converter. This means that, according to some embodiments of the invention, in a voltage source converter of the first type for converting between AC and DC, each phase leg, and here also each arm of each phase leg, includes at least one cell in the first group. There is furthermore at least one cell in the second group connected to the cells of the first group. The cells in the second group can here include at least one cell of the third type. It can also include at least two cells of the first or the second types with opposite orientation in relation to each other in their connections to the cells of the first group.

The use of the cells in a voltage source converter according to the first embodiment of the invention will now be described in more detail with reference being made to FIGS. 2 and 3.

In this first embodiment at least one cell in the second group is connected between the two end points of the phase leg. In the first embodiment of the invention, this connection involves actually connecting such cells in the second group into the phase leg. In dependence of what type of converter and the environment that is required, the number of cells in the different groups may vary. If for instance the voltage source converter is to be included as an inverter or a rectifier in an HVDC system, then there would normally be many cells in the first group and then as many as are needed for normal basic conversion activity, while there are a number of cells in the second group according to the kind of additional functionality that is desired.

This means that when the voltage source converter, as in the first embodiment of the invention, is an HVDC converter the first group of cells is provided for the basic functionality, while the second group is provided for enhancing the performance. In for instance an HVDC inverter, there may be provided cells that do not contribute to the actual inversion/rectification of the voltage, but instead enhance the performance.

As an example only of a converter according to a variation of the invention, the positive arm may include a first cell of the first type, a second cell of the second type and a third cell of the third type, where the first and second cells are in the first group and involved in normal operation i.e. in normal inverting/rectifying operation. These cells therefore provide a controllable voltage source of the first type. However, the third cell is provided in the second group for enhancing the operation of the voltage source converter. Thus this cell here provides the second type of controllable voltage source converter. Here it should be mentioned that also the cells of the negative arm could be and normally are of the same types and provided in the same groups as the cells in the positive arm.

The normal converter operation may involve controlling the voltage sources of the first type U1p1, U1p2 and U1p3 in the positive arms of the phase legs so that they each provide a DC component corresponding to a desired positive DC voltage and an AC component corresponding to half a desired AC voltage. The cells C1p1, C2p1, C1p2, C2p2, C1p3, C2p3 of each arm are here controlled in time so that they together provide the voltage contribution corresponding to the DC component and the AC component. Each voltage source of the first type in the negative arms U1n1, U1n2, U1n3 are controlled so that they each provide a DC component corresponding to a desired negative DC voltage and an AC component corresponding to the other half of the desired AC voltage. This is done through controlling the cells C1n1, C2n1, C1n2, C2n2, C1n3 and C2n3 according to the same principles that were described above. In this way the desired AC voltage is provided on the AC terminals AC1 AC2 and AC3, while a positive DC voltage may be provided on the first DC terminal DC+ and a negative DC voltage on the second DC terminal DC−.

The voltage sources of the first type of the converter 26 may here be controlled for operation of the converter in two directions. If AC voltages are applied on the AC terminals AC1, AC2 and AC3 a DC voltage is generated, while if a DC voltage is applied between the DC terminals DC+ and DC−, a three-phase AC voltage is generated on terminals AC1, AC2 and AC3. The variable voltage sources of the first type thus provide voltages that assist in the conversion in both directions i.e. they assist in conversion from both AC to DC and from DC to AC. The control unit 28 may here generate control signals based on PWM modulation using a triangular carrier wave. This type of conversion may in a known way be used for providing bidirectional transfer of active power. This is the basic functionality of the controllable voltage sources of the first type in the voltage source converter of the first type.

In a first example of operation of the device according to the first embodiment in FIGS. 2 and 3, the cells in the second group of cells, forms controllable voltage sources of the second type that are being used in order to add or remove reactive power to the AC side of the voltage source converter. This can be done in order to stabilize an AC network. This is according to one variation of the present invention done through the control unit 28 providing the cells that perform this function, i.e. the cells of the third type and here cells C3p1, C3n1, C3p2, C3n2, C3p3, C3n3 with control signals causing the cells C3p1, C3p2, C3p3 in the positive arms to provide one half of the desired AC contribution and causing the cells C3n1, C3n2, C3n3 in the negative arms to provide the other half of the desired AC contribution (with the same frequency and phase as is used in the basic conversion, which total contribution is a reactive power contribution to the AC terminals AC1, AC2 and AC3. The power contribution can be a positive contribution, i.e. an adding of reactive power to the AC side of the converter, or a negative contribution, i.e. a removal of reactive power from the AC side of the converter.

As another example it is possible that the same cells are controlled to provide AC voltage components related to a third harmonic zero sequence. The cells of the third type in a positive arm may then provide an AC contribution corresponding to half of a third harmonic AC voltage, while the cell of the third type in the negative arm may provide an AC contribution corresponding to the other half of the third harmonic AC voltage. In this way it is possible to provide the third harmonic zero sequence at the AC terminals. This allows the modulation range to be enhanced. The modulation index is thus raised through such an addition. If for instance one third harmonic is added a modulation index of $2/\sqrt{3}$ may be obtained.

According to another variation of the invention the cells in the second group are used in order to remove circulating AC currents in the phase legs. The circulating currents are caused by cell capacitor ripple. This is according to one variation of the present invention counteracted through the control unit 28 providing control signals causing the cells in the positive and negative arms to provide a correcting AC voltage contribution appearing on each phase leg. The sum of the AC contributions of the phase legs is here zero and therefore there is no AC contribution appearing on the DC side of the converter. The AC contributions of each phase leg are also selected to cancel each other on the corresponding AC terminals and therefore there is also no AC contribution appearing on the AC terminals. In this way a common voltage contribution may be provided in each phase leg that is dependent on the current of the AC side, the phase angle as well as the reactance of the capacitors. These contributions will then counteract an AC signal on the DC side caused by said cell capacitor ripple.

It should here furthermore be realized that a subset in the second group could be dedicated to one of the additional functions, while another subset is dedicated to another additional function. There could therefore be a subset of cells in the second group for each additional function that is desired.

These were just a few possible variations of the present invention. What is obtained is that through combining cells in the second group with cells in the first group, it is possible to provide cells that are not involved directly in the basic functionality of the converter operation but that removes some of the problems or enhances the functionality of the converter. An example of such problem removal is removal of circulating currents. Examples of enhanced functionality are zero sequence third harmonics removal and addition and reactive power removal and addition. In this way it is possible to address problems in and enhance the operation of voltage source converters. This is furthermore done at small extra cost in the form of additional components and software. Because cells are used, it is furthermore possible to provide the voltage source converter as a modular voltage source converter. It is thus possible to select cells in one group based on the basic functionality required and then add cells in the other group based on how many and which additional functions are desired. Through having cells dedicated to a specific function, the control signals are simplified, since a control signal being provided to a group of cells or a subset of a group of cells can be formed for only handling this functionality without having to consider the basic converter functionality or any other additional functionality. Thus both the design of the actual converter as well as the control scheme used for it is simplified. This also enables the cells to be optimized for the functionality they are to provide.

Figure 7:
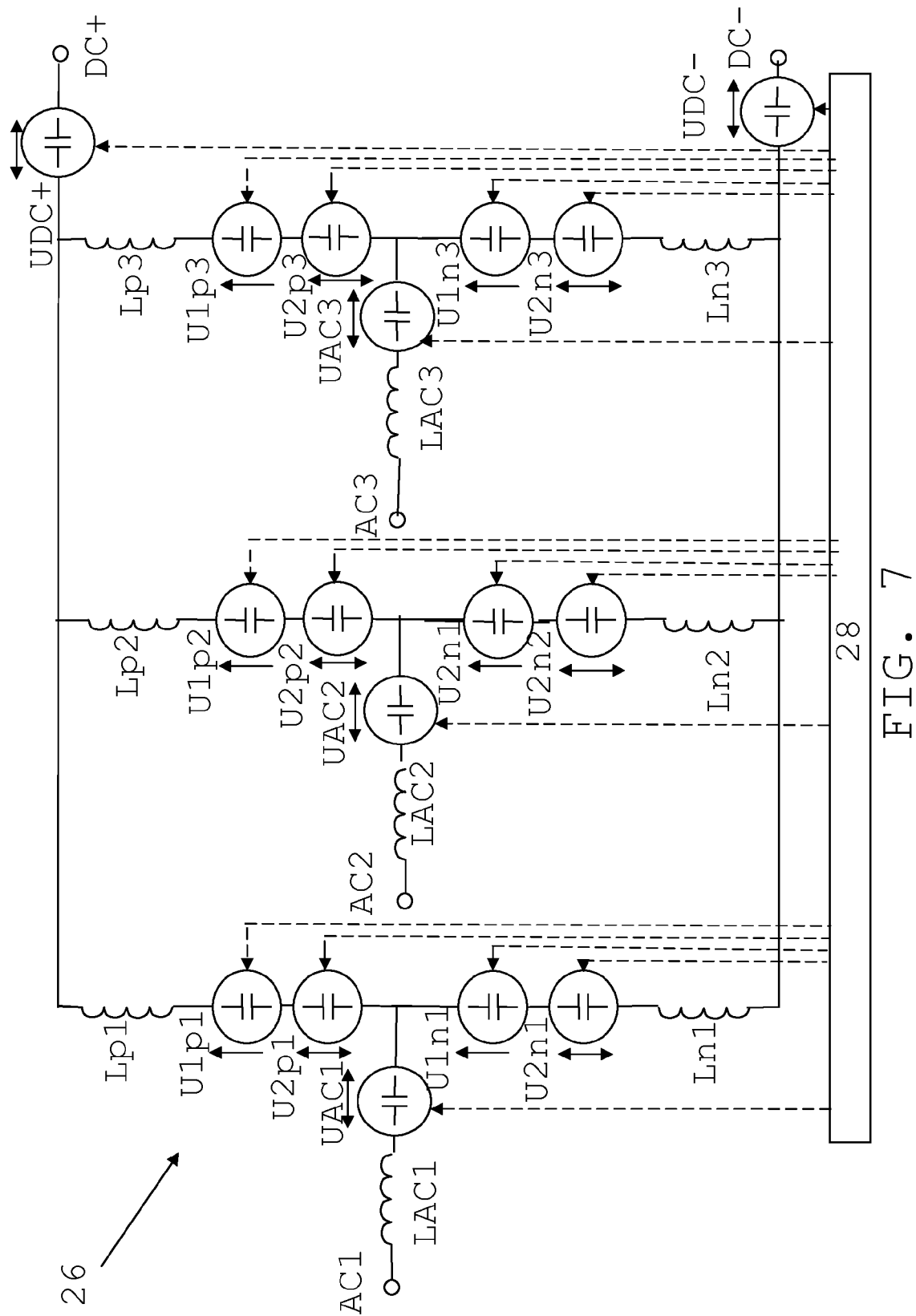

It should here be realized that the second type of controllable voltage source made up of cells in the second group is not limited to being provided in a phase leg. Such a voltage source can also, in the voltage source converter, be provided in a connective branch between a phase leg and a terminal, for instance in a DC connective branch, i.e. in or via a connective branch stretching between an AC terminal and a junction between the positive and negative arm of a phase leg, or in a DC terminal connecting branch, i.e. in a connective branch connecting a DC terminal with one end of the parallel phase legs. This situation is depicted in FIG. 7, which shows a converter of the second type according to a second embodiment of the invention. The difference between the converter according to this second embodiment of the invention and the converter according to the first embodiment of the invention is that there is a controllable voltage source of the second type UAC1, UAC2 and UAC3 provided in each connective branch leading to the AC terminals AC1, AC2 and AC3 as well as a controllable voltage source of the second type UDC+ and UDC− in the first and second connective branches leading to the DC terminals. It may thus be possible to connect cells in the second group in a connective branch leading to an AC terminal as well as or instead in a connective branch leading to a DC terminal. Cells in the second group can thus be placed in a connective branch connecting an AC terminal with a junction between the positive and negative arms of a phase leg as well as being connected to a phase leg via the connective branch connecting a DC terminal with one end of the phase legs. These cells may also be provided symmetrically, which means that if one connective branch leading to an AC terminal has a cell then also the other branches leading to the other AC terminals will have the same type of cell. This may also be true for the connective branches leading to the DC terminals. The cells in the connective branches can then with advantage be provided for performing third harmonic addition/removal or reactive power addition/removal. It is thus as an example possible that the cells in the connective branches leading to the AC terminals are used for third harmonic addition/removal and the cells in the connective branches leading to the DC terminals are used for reactive power generation/removal or vice versa. It is also possible that cells in the second group placed in the phase legs are used for removing circulating AC currents. It should here furthermore be realized that the cells in the connective branches leading to the DC terminals would typically be provided in the same way as the cells in the corresponding arms of the phase legs, i.e. provide an AC component corresponding to half the desired AC voltage contribution. However, the cell in a connective branch leading to an AC terminal would in contrast provide the whole desired AC component contribution.

There are a number of variations that are possible to be made of the present invention apart form the variations already mentioned. It should for instance be realized that in the second embodiment it is possible to omit the cells in the second group from the phase legs as well as from one of the two types of connective branches. It is also possible to omit inductors from connective branches as well as from phase legs. The inductors in the phase legs may also have other positions than the ones shown. They may for instance be provided connected to the midpoints instead.

The semiconductor elements used in the cells have been described as IGBTs. It should be realized that other types of semiconductor elements may be used, such as thyristors, MOSFET transistors, GTOs (Gate Turn-Off Thyristor) and mercury arc valves. The number of cells of different types and their orientations may furthermore be varied in a multitude of ways depending on the desired functionality and voltage levels.

The control unit need not be provided as a part of the voltage source converter of the present invention. It can be provided as a separate device that provides control signals to the voltage source converter. This control unit may furthermore be realized in the form of a processor with accompanying program memory comprising computer program code that performs the desired control functionality when being run on the processor.

From the foregoing discussion it is evident that the present invention can be varied in a multitude of ways. It shall consequently be realized that the present invention is only to be limited by the following claims.

The invention claimed is:
1. A voltage source converter for connection between power transmission elements related to a power transmission system, and comprising:
   three interconnected phase legs connected in parallel between two direct current terminals of the voltage source converter, where each phase leg has a first and a second end point via which said interconnection is achieved;
   at least-three connection terminals for connecting the phase legs to said power transmission elements;
   a first group of cells and a second group of cells, wherein each cell includes a group of switching elements and one energy storage element, and the group of switching elements is connected in parallel with the one energy storage element, the cells in the first group of cells are only capable of providing unipolar voltage contributions to an operation of the voltage source converter and also connected in the phase legs for only being capable of such unipolar voltage contributions, the cells in the second group of cells are connected to the corresponding cells of the first group of cells and configured for being capable of providing bipolar voltage contributions to the operation of the voltage source converter, the cells in the first group of cells are dedicated to an AC-DC or DC-AC conversion function of the voltage source converter, the cells in the second group of cells are dedicated to providing additional AC voltages;
   a control unit configured to provide control signals to the cells in the first group of cells to control the operation of the voltage source converter according to the AC-DC or DC-AC conversion function and to provide control signals to the cells in the second group of cells for making the cells in the second group of cells provide the additional AC voltages; and
   wherein each phase leg further comprises:
      a positive arm and a negative arm;
      cells of the first group of cells and cells of the second group of cells in each of the positive and negative arms, wherein the number of cells according to type and their orientation is the same in each of the positive and negative arms; and
      one inductor included within the positive arm and another inductor included within the negative arm.
2. The voltage source converter according to claim 1, wherein said switching elements in the group of switching elements are connected in series with each other.

3. The voltage source converter according to claim 1, wherein each switching element of the group of switching elements includes a transistor together with an anti-parallel diode.

4. The voltage source converter according to claim 1, wherein each of the inductors included within the positive and negative arms of the phase legs is connected to a corresponding one of the two direct current terminals.

5. The voltage source converter according to claim 1, wherein each phase leg is connected to a corresponding AC terminal of the at least three connection terminals via a connective branch including another inductor that is different from the inductors included within the positive and negative arms of the phase legs.

6. The voltage source converter according to claim 1, wherein one of the cells in the positive arm and one of the cells in the negative arm of each phase leg are directly connected to each other.

7. The voltage source converter according to claim 6, wherein
a first terminal of the one of the cells in the positive arm and a first terminal of the one of the cells in the negative arm of each phase leg are directly connected to each other and joined together at a midpoint of the phase leg, and
a second terminal of the one of the cells in the positive arm is directly connected to a first terminal of another one of the cells in the positive arm, and a second terminal of the one of the cells in the negative arm is directly connected to a first terminal of another one of the cells in the negative arm.

8. The voltage source converter according to claim 1, wherein three of the at least three connection terminals are AC connection terminals and the control unit is configured to provide control signals to at least some cells of the second group of cells in the positive arms to provide an AC contribution corresponding to half of a third harmonic AC voltage and control signals to cells of the second group of cells in the negative arms to provide an AC contribution corresponding to the other half of the third harmonic AC voltage for making these cells provide a third harmonic zero sequence on all AC connection terminals.

9. The voltage source converter according to claim 1, wherein the control unit is configured to provide control signals to cells of the second group of cells in the positive arms to provide one half of a desired AC contribution and control signals to cells in the second group of cells in the negative arms to provide the other half of the desired AC contribution for increasing a reactive power capability of the voltage source converter.

10. The voltage source converter according to claim 1, wherein the control unit is configured to provide control signals to at least some cells of the second group of cells for making these cells provide a common AC voltage contribution that counteracts current circulation between the phase legs and also causing the AC voltage contributions of the cells in each phase leg to cancel each other on corresponding AC terminals.

11. The voltage source converter according to claim 1, wherein said second group of cells includes at least two cells, each cell having unipolar voltage contribution capability and having opposite orientations in relation to each other in their connection to the cells of the first group of cells.

12. The voltage source converter according to claim 11, wherein at least one connection terminal of the at least three connection terminals is joined to a one of the phase legs via a connective branch including at least one cell in the second group of cells.

13. The voltage source converter according to claim 11, wherein three of the at least three connection terminals are AC connection terminals and the control unit is configured to provide control signals to at least some cells of the second group of cells in the positive arms to provide an AC contribution corresponding to half of a third harmonic AC voltage and control signals to cells of the second group of cells in the negative arms to provide an AC contribution corresponding to the other half of the third harmonic AC voltage for making these cells provide a third harmonic zero sequence on all AC connection terminals.

14. The voltage source converter according to claim 11, wherein the control unit is configured to provide control signals to cells of the second group of cells in the positive arms to provide one half of a desired AC contribution and control signals to cells in the second group of cells in the negative arms to provide the other half of the desired AC contribution for increasing a reactive power capability of the voltage source converter.

15. The voltage source converter according to claim 1, wherein at least one connection terminal of the at least three connection terminals is joined to a one of the phase legs via a connective branch including at least one cell in the second group of cells.

16. The voltage source converter according to claim 15, wherein at least one cell in the second group of cells is connected to the cells of the first group of cells via a connective branch that stretches between one of the at least three connection terminals and a midpoint of one of the phase legs.

17. The voltage source converter according to claim 16, wherein three of the at least three connection terminals are AC connection terminals and the control unit is configured to provide control signals to at least some cells of the second group of cells in the positive arms to provide an AC contribution corresponding to half of a third harmonic AC voltage and control signals to cells of the second group of cells in the negative arms to provide an AC contribution corresponding to the other half of the third harmonic AC voltage for making these cells provide a third harmonic zero sequence on all AC connection terminals.

18. The voltage source converter according to claim 16, wherein the control unit is configured to provide control signals to cells of the second group of cells in the positive arms to provide one half of a desired AC contribution and control signals to cells in the second group of cells in the negative arms to provide the other half of the desired AC contribution for increasing a reactive power capability of the voltage source converter.

19. The voltage source converter according to claim 15, wherein at least one cell in the second group of cells is connected to the cells in the first group of cells via a connective branch connecting one of the at least three connection terminals with one end of at least one of the phase legs.

20. The voltage source converter according to claim 19, wherein three of the at least three connection terminals are AC connection terminals and the control unit is configured to provide control signals to at least some cells of the second group of cells in the positive arms to provide an AC contribution corresponding to half of a third harmonic AC voltage and control signals to cells of the second group of cells in the negative arms to provide an AC contribution corresponding to the other half of the third harmonic AC voltage for making these cells provide a third harmonic zero sequence on all AC connection terminals.

21. The voltage source converter according to claim 19, wherein the control unit is configured to provide control signals to cells of the second group of cells in the positive arms to provide one half of a desired AC contribution and control signals to cells in the second group of cells in the negative arms to provide the other half of the desired AC contribution for increasing a reactive power capability of the voltage source converter.

22. The voltage source converter according to claim 15, wherein three of the at least three connection terminals are AC connection terminals and the control unit is configured to provide control signals to at least some cells of the second group of cells in the positive arms to provide an AC contribution corresponding to half of a third harmonic AC voltage and control signals to cells of the second group of cells in the negative arms to provide an AC contribution corresponding to the other half of the third harmonic AC voltage for making these cells provide a third harmonic zero sequence on all AC connection terminals.

23. The voltage source converter according to claim 15, wherein the control unit is configured to provide control signals to cells of the second group of cells in the positive arms to provide one half of a desired AC contribution and control signals to cells in the second group of cells in the negative arms to provide the other half of the desired AC contribution for increasing a reactive power capability of the voltage source converter.

* * * * *